United States Patent
Son et al.

(10) Patent No.: US 11,056,725 B2
(45) Date of Patent: Jul. 6, 2021

(54) ELECTRODE AND LITHIUM SECONDARY BATTERY COMPRISING SAME

(71) Applicant: LG CHEM, LTD., Seoul (KR)

(72) Inventors: Byoungkuk Son, Daejeon (KR); Minehul Jang, Daejeon (KR); Eunkyung Park, Daejeon (KR); Junghun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 212 days.

(21) Appl. No.: 16/329,076

(22) PCT Filed: Nov. 8, 2017

(86) PCT No.: PCT/KR2017/012565
§ 371 (c)(1),
(2) Date: Feb. 27, 2019

(87) PCT Pub. No.: WO2018/093088
PCT Pub. Date: May 24, 2018

(65) Prior Publication Data
US 2019/0229380 A1  Jul. 25, 2019

(30) Foreign Application Priority Data

Nov. 21, 2016 (KR) .................. 10-2016-0155234
Oct. 30, 2017 (KR) .................. 10-2017-0142400

(51) Int. Cl.
*H01M 10/42* (2006.01)
*H01M 4/36* (2006.01)
(Continued)

(52) U.S. Cl.
CPC ....... *H01M 10/4235* (2013.01); *H01M 4/131* (2013.01); *H01M 4/133* (2013.01);
(Continued)

(58) Field of Classification Search
CPC .......... H01M 10/052; H01M 10/0525; H01M 10/0569; H01M 10/4235; H01M 12/08;
(Continued)

(56) References Cited

U.S. PATENT DOCUMENTS

2001/0004504 A1\* 6/2001 Nakamizo ......... H01M 10/0525
429/137
2002/0061437 A1   5/2002 Gan et al.
(Continued)

FOREIGN PATENT DOCUMENTS

JP    2002-237334 A    8/2002
JP    2004-87251 A    3/2004
(Continued)

OTHER PUBLICATIONS

Yamamoto et al., Espacenet machine translation for JP 2004087251 A, Non-Aqueous Electrolyte Secondary Battery, 2004 (Year: 2004).\*
(Continued)

*Primary Examiner* — Adam A Arciero
(74) *Attorney, Agent, or Firm* — Birch, Stewart, Kolasch & Birch, LLP

(57) ABSTRACT

An electrode and a lithium secondary battery comprising the same, in particularly an electrode comprising an electrode layer, a pre-lithiation prevention layer formed on the electrode layer, and a lithium layer formed on the pre-lithiation prevention layer, which is capable of greatly improving the problem of the reduction of irreversible capacity of a negative electrode while preventing fire caused by a lithiation reaction due to contact between lithium and silicon before assembling a cell, and a lithium secondary battery including the same.

15 Claims, 2 Drawing Sheets

(51) Int. Cl.

| | |
|---|---|
| *H01M 4/62* | (2006.01) |
| *H01M 4/131* | (2010.01) |
| *H01M 4/46* | (2006.01) |
| *H01M 4/38* | (2006.01) |
| *H01M 12/08* | (2006.01) |
| *H01M 4/485* | (2010.01) |
| *H01M 10/052* | (2010.01) |
| *H01M 4/583* | (2010.01) |
| *H01M 4/133* | (2010.01) |
| *H01M 4/134* | (2010.01) |
| *H01M 10/0525* | (2010.01) |
| *H01M 10/0569* | (2010.01) |
| *H01M 4/02* | (2006.01) |

(52) U.S. Cl.
CPC ........... *H01M 4/134* (2013.01); *H01M 4/366* (2013.01); *H01M 4/386* (2013.01); *H01M 4/387* (2013.01); *H01M 4/463* (2013.01); *H01M 4/485* (2013.01); *H01M 4/583* (2013.01); *H01M 4/628* (2013.01); *H01M 10/052* (2013.01); *H01M 10/0525* (2013.01); *H01M 10/0569* (2013.01); *H01M 12/08* (2013.01); *H01M 2004/027* (2013.01); *H01M 2004/028* (2013.01); *H01M 2220/10* (2013.01); *H01M 2220/20* (2013.01); *H01M 2220/30* (2013.01); *Y02E 60/10* (2013.01)

(58) Field of Classification Search
CPC ... H01M 2004/027; H01M 2004/2004; H01M 2004/028; H01M 2220/10; H01M 2220/20; H01M 2220/30; H01M 4/131; H01M 4/133; H01M 4/134; H01M 4/366; H01M 4/386; H01M 4/387; H01M 4/463; H01M 4/485; H01M 4/583; H01M 4/328; Y02E 60/10
See application file for complete search history.

(56) References Cited

U.S. PATENT DOCUMENTS

| | | | |
|---|---|---|---|
| 2005/0084760 A1 | 4/2005 | Hwang et al. | |
| 2007/0190416 A1 | 8/2007 | Yamada et al. | |
| 2010/0075225 A1* | 3/2010 | Wilkins | H01M 4/136 429/212 |
| 2010/0330430 A1 | 12/2010 | Chung et al. | |
| 2011/0111294 A1 | 5/2011 | Lopez et al. | |
| 2011/0177398 A1 | 7/2011 | Affinito et al. | |
| 2012/0070742 A1* | 3/2012 | Chung | H01M 4/40 429/221 |
| 2014/0315091 A1* | 10/2014 | Yamazaki | H01M 4/0426 429/231.8 |
| 2016/0149212 A1 | 5/2016 | Zaghib et al. | |
| 2016/0181594 A1 | 6/2016 | Balogh et al. | |
| 2017/0104209 A1 | 4/2017 | Son et al. | |
| 2017/0309899 A1 | 10/2017 | Son et al. | |
| 2017/0338480 A1 | 11/2017 | Kim et al. | |

FOREIGN PATENT DOCUMENTS

| | | |
|---|---|---|
| JP | 2005-63805 A | 3/2005 |
| JP | 2007-242590 A | 9/2007 |
| JP | 2010-113964 A | 5/2010 |
| JP | 2012-528450 A | 11/2012 |
| JP | 2013-510405 A | 3/2013 |
| JP | 2015-46220 A | 3/2015 |
| KR | 10-2001-0062467 A | 7/2001 |
| KR | 10-0560541 B1 | 3/2006 |
| KR | 10-2010-0127730 A | 12/2010 |
| KR | 10-1156608 B1 | 6/2012 |
| KR | 10-2015-0101808 A | 9/2015 |
| KR | 10-2015-0143372 A | 12/2015 |
| KR | 10-2016-0023653 A | 3/2016 |
| KR | 10-2016-0033608 A | 3/2016 |
| KR | 10-2016-0034183 A | 3/2016 |
| KR | 10-2016-0047991 A | 5/2016 |
| KR | 10-2016-0094652 A | 8/2016 |
| WO | WO 2011/056847 A2 | 5/2011 |

OTHER PUBLICATIONS

International Search Report (PCT/ISA/210) issued in PCT/KR2017/012565, dated Feb. 19, 2018.
European Search Report for Appl. No. 17871180.0 dated Jul. 23, 2019.
Electrochemical Society Battery Technology Committee, "Battery handbook large book", Japan, Publisher: Ohmsha, 2010, p. 163 with an English translation.

* cited by examiner

[Figure 1]
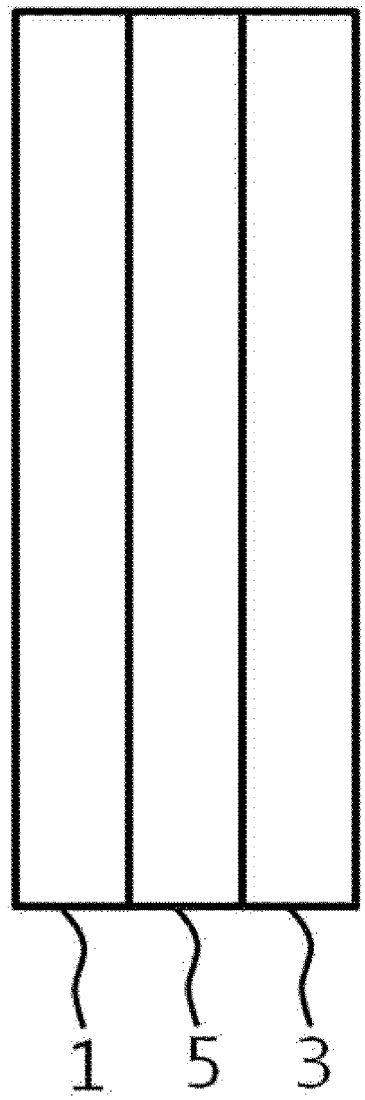

[Figure 2]
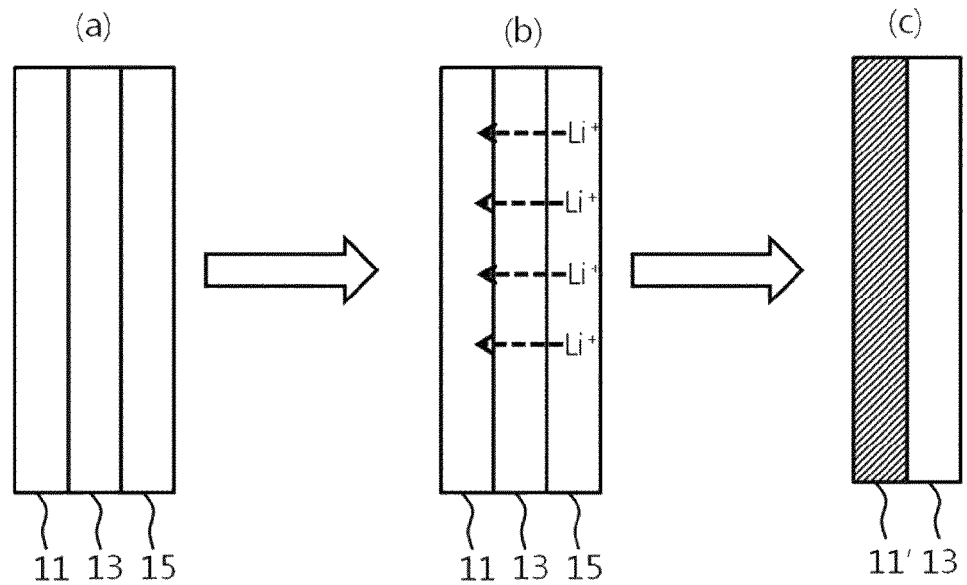
[Figure 3]
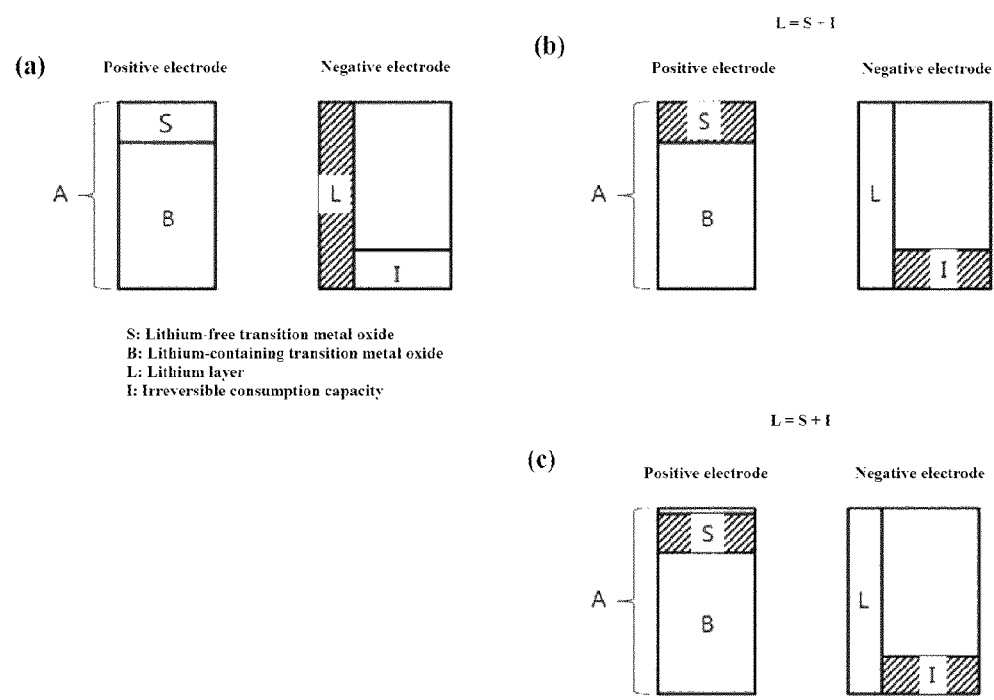

ELECTRODE AND LITHIUM SECONDARY BATTERY COMPRISING SAME

TECHNICAL FIELD

This application claims the benefit of Korean Patent Application No. 10-2016-0155234, filed on Nov. 21, 2016, with the Korean Intellectual Property Office and Korean Patent Application No. 10-2017-0142400 filed on Oct. 30, 2017, with the Korean Intellectual Property Office, the disclosure of which are incorporated herein by reference.

The present invention relates to an electrode for an irreversible capacity compensation and a lithium secondary battery comprising the same.

BACKGROUND ART

Lithium secondary batteries are used in a variety of industries, from small electronic devices, including smart phones, notebooks and tablet PCs, to automotive batteries, etc. Batteries are being developed in a technological direction of miniaturization, weight reduction, high performance, and high capacity.

Currently, lithium secondary batteries with superior durability life are being developed. However, a significant improvement in energy per price and energy per weight is required for batteries. For this purpose, a lithium alloy material which contains elements that can form an alloy with a large amount of lithium per unit weight is being intensively developed to form a high-capacity negative electrode.

For example, in the case of a carbon-based negative electrode active material, a solid electrolyte interface (SEI) layer is formed on the surface of the negative electrode active material during the initial charging/discharging process (activation process), and thus there is a problem that the initial irreversible phenomenon is induced and the battery capacity is reduced due to depletion of the electrolyte solution in the continuous charging/discharging process.

In addition, a silicon-based material exhibits a high capacity. However, in the case of the silicon-based material, as the cycle is progressed, the volume expansion rate becomes 300% or more and thus the resistance can be increased and the side reaction of the electrolyte solution can be increased, and thus the problem due to the formation of the SEI layer, such as damage to the electrode structure, may become serious.

In addition, in the case of a silicon oxide based material, although it can be considered for use because it has low volumetric expansion rate and excellent durability life characteristics compared with a silicon-based material, this also has the problem that the formation of the SEI layer upon charging and the initial irreversibility into $Li_2O$ due to oxygen in the active material are large.

As one of methods for solving the problems related to the initial irreversibility, it was tried to completely lower the initial irreversibility and thus improve cycle characteristics by placing the negative electrode in a solution containing a lithium source and applying current thereto, thereby performing the pre-lithiation reaction. However, in this method, when the lithium layer is formed on the negative electrode, there is a problem that welding between the non-coating portion of the negative electrode and the negative electrode lead becomes difficult and thus the cell cannot be fabricated, due to the problem that lithium byproducts are also formed on the non-coating portion of the negative electrode, which is not coated with the negative electrode active material.

Another attempt was intended to solve the problem of irreversible capacity reduction by forming a lithium layer on the electrode layer and then moving the lithium in the lithium layer to the electrode through activation, thereby increasing the lithium content in the electrode. This method can solve the problem of the reduction of capacity to some extent, but as the material of the electrode layer and the lithium layer are in direct contact with each other, lithiation has occurred, thereby causing another problem of fire or explosion.

Therefore, there is a great need for a technique for preparing a lithium secondary battery capable of compensating or improving the reduction of irreversible capacity while solving such problems.

PATENT LITERATURE (Patent Literature 1) WO 2011/056847 (2011 May 12), HIGH CAPACITY ANODE MATERIALS FOR LITHIUM ION BATTERIES

DISCLOSURE

Technical Problem

In order to solve the above problems, the present inventors have prepared an electrode having a multilayer structure which is safe from fire or explosion and is capable of compensating for the reduction of irreversible battery capacity by forming a prevention layer, which can prevent the formation of a pre-lithiation reaction layer, instead of forming the pre-lithiation reaction layer, through various studies, and have prepared a lithium secondary battery having the same Therefore, it is an object of the present invention to provide an electrode for a lithium secondary battery capable of compensating for the irreversible capacity reduction without any risk of explosion or fire.

In addition, another object of the present invention is to provide a lithium secondary battery having the electrode according to the present invention.

Technical Solution

In order to achieve the above objects, the present invention provides an electrode for a lithium secondary battery characterized by comprising an electrode layer; a pre-lithiation prevention layer formed on the electrode layer; and a lithium layer formed on the pre-lithiation prevention layer.

In this case, it is characterized in that the lithium layer does not remain as a lithium in the form of metal after the initial activation charging.

The present invention also provides a lithium secondary battery comprising a negative electrode, a positive electrode, and a separator and electrolyte located therebetween, characterized in that at least one of the negative electrode and the positive electrode is the electrode as described above.

Advantageous Effects

In the case of the electrode according to the present invention, since the pre-lithiation prevention layer plays a role of preventing the pre-lithiation reaction, the irreversible capacity of the electrode, especially the negative electrode, is greatly improved, while the fire by the lithiation reaction due to the contact of lithium and silicon before assembling the cell is prevented.

DESCRIPTION OF DRAWINGS

FIG. 1 is a cross-sectional view illustrating a lithium secondary battery according to an embodiment of the present invention.

FIG. 2 is a cross-sectional view illustrating an electrode and its activation process according to an embodiment of the present invention.

FIG. 3 is a schematic diagram for explaining the concept of the irreversible capacity, wherein (a) is a schematic diagram showing the irreversible capacity before the initial activation charging and (b) and (c) are schematic diagrams showing the change in the irreversible capacity after the initial activation charging.

BEST MODE

Hereinafter, the present invention will be described in more detail.

The theoretical capacity of the battery is a value calculated according to the theoretical maximum value of Faraday's law, but the actual capacity of the battery is far below the theoretical value due to various factors. Particularly, silicon or carbon material as the electrode active material inevitably causes reduction in the capacity of the battery due to the initial high irreversible characteristics. As one of methods to solve this problem, an electrode having a multi-layer structure in which a lithium layer is laminated was suggested. However, in the case of this method, there was a problem that before the assembly of the battery, a lithiation reaction occurs due to the contact between lithium and the active material, thereby causing explosion or fire of the battery.

Accordingly, the present invention discloses a new electrode structure capable of preventing direct contact between the electrode layer and the lithium layer to solve the above-described problems, and a lithium secondary battery having the electrode structure.

FIG. 1 is a cross-sectional view of a lithium secondary battery 10 according to an embodiment of the present invention, wherein there a separator 5 and electrolyte (not shown) are present between the negative electrode 1 and the positive electrode 3.

FIG. 2 is a cross-sectional view showing an electrode and its activation process according to an embodiment of the present invention, wherein the negative electrode 1 and/or the positive electrode 3 of FIG. 1 has a multilayer structure as shown in FIG. 2.

Specifically, the electrodes 1 and 3 have a structure in which an electrode layer 11, a pre-lithiation prevention layer 13 and a lithium layer 15 are sequentially stacked, and are characterized in that the lithium layer 15 does not remain as a lithium in the form of metal after the initial activation charging.

Specifically, FIG. 2 shows the structure of the electrode before and after activation. First, the multi-layered structure of three layers of the electrode layer 11, the pre-lithiation prevention layer 13, and the lithium layer 15 is fabricated as an electrode, and the assembly of the battery is performed in this state. The lithium secondary battery thus assembled maintains its own shape before the initial activation (a).

However, during the initial activation charging (b), the lithium metal present in the lithium layer 15 is transferred in an ionized state to the electrode layer 11 through the pre-lithiation prevention layer 13. The lithium metal ions thus transferred are alloyed with the electrode layer material existing in the electrode layer 11.

The initial activation charging is performed once or twice.

Next, after initial activation (c), the electrode has a structure in which the pre-lithiation prevention layer 13 is formed on the electrode layer 11' with lithium added thereto. In this case, the electrode layer 11' is a layer in which the negative electrode material is alloyed with lithium, differs in lithium capacity from the initially prepared electrode layer 11; and can compensate for the reduction of the irreversible capacity of the lithium-added electrode layer 11' by the increased lithium capacity.

The electrode material constituting the electrode layer 11 is liable to cause explosion, etc. due to lithiation when it comes into contact with lithium before assembling the battery. Accordingly, this problem can be avoided only by avoiding direct contact between the electrode layer 11 and the lithium layer 15 from the assembly of the cell to the initial activation charging Therefore, in the present invention, the pre-lithiation prevention layer 13 is formed between the electrode layer 11 and the lithium layer 15.

In addition to preventing direct contact between the electrode material of the electrode layer 11 and the lithium of the lithium layer 15, the pre-lithiation prevention layer 13 should be able to perform the function of transferring lithium ions so that after the initial activation charging, lithium metal ions in the lithium layer 15 can be transferred to the electrode layer 11. In this case, after the activation charging, since lithium in the lithium layer 15 should not remain, the pre-lithiation prevention layer 13 should have a certain level of lithium ion conductivity and at the same time its thickness should be limited so that the pre-lithiation prevention layer 13 itself does not act as a resistance layer.

A material having lithium ion conductivity while easily forming a coating film can be used as a material for forming the pre-lithiation prevention layer 13 according to the present invention. Specifically, the pre-lithiation prevention layer 13 may be at least one selected from the group consisting of polyethylene oxide, polypropylene oxide, polydimethylsiloxane, polyacrylonitrile, polymethyl methacrylate, polyvinyl chloride, polyvinylidene fluoride, polyvinylidene fluoride-co-hexafluoropropylene, polyethylene imine, polyphenylene terephthalamide, polymethoxy polyethylene glycol methacrylate, poly 2-methoxyethyl glycidyl ether and combinations thereof, preferably may be polyvinylidene fluoride-co-hexafluoropropylene.

The lithium ion conductivity of the pre-lithiation prevention layer 13 should be $10^{-3}$ S/cm or less, preferably $10^{-6}$ to $10^{-3}$ S/cm.

The thickness of the pre-lithiation prevention layer 13 can be limited to a range where the lithium metal ion can be easily transferred and it does not act as a resistance layer. Specifically, the thickness may be 0.5 to 5 μm, preferably 1 to 3 μm. If the thickness is less than the above range, there is a risk of tearing during the preparing process of the negative electrode 1 and the battery 10. On the contrary, if the thickness exceeds the above range, although stable assembly of the battery 10 is possible, the lithium layer 15 cannot be, after the activation charging, completely transferred to the side of the negative electrode by causing the increase of the internal resistance and thus the compensation effect in accordance with the reduction of the irreversible capacity of the lithium secondary battery 10 cannot be ensured.

The pre-lithiation prevention layer 13 may be coated directly on the electrode layer 11, or may be applied by a manner of coating it on a separate substrate to form a coating film, and then laminating the coating film with the electrode layer 11. The coating may be formed by using the polymer material as it is as described above, or may be formed by preparing a solution of the monomer, initiator, etc., followed by polymerization. More details will be described in the following description of the preparation method.

The electrode comprising the pre-lithiation prevention layer 13 may constitute the negative electrode 1 or the positive electrode 3 of the lithium secondary battery 10, or both.

In this case, if the electrode is the negative electrode 1, the electrode layer 11 may be a layer in which a negative electrode lamination layer containing the negative electrode active material is formed on the negative electrode current collector. If the electrode is the positive electrode 3, the electrode layer 11 may be a layer in which a positive electrode lamination layer containing the positive electrode active material is formed on the positive electrode current collector.

The negative electrode current collector is not particularly limited as long as it has electrical conductivity without causing any chemical change in the battery. Examples of the negative electrode current collector may include copper, stainless steel, aluminum, nickel, titanium, sintered carbon, copper or stainless steel produced by treating its surface with carbon, nickel, titanium, silver or the like, or aluminum-cadmium alloy, etc.

In addition, the negative electrode current collector may be various forms such as films, sheets, foils, nets, porous structures, foams, and non-woven fabrics which have/do not have fine unevenness formed on their surface. Most preferably a copper foil is used as the negative electrode current collector.

The positive electrode current collector is not particularly limited as long as it has high electrical conductivity without causing chemical changes in the battery. Examples of the positive electrode current collector may include stainless steel, aluminum, nickel, titanium, sintered carbon, or copper or stainless steel produced by treating its surface with carbon, nickel, titanium, silver or the like.

In addition, the positive electrode current collector may be various forms such as films, sheets, foils, nets, porous structures, foams, and non-woven fabrics which have/do not have fine unevenness formed on the surface. Most preferably an aluminum foil is used as the positive electrode current collector.

The negative electrode lamination layer and the positive electrode lamination layer as described above may vary depending on the type of lithium secondary battery.

The lithium secondary battery 10 of the present invention can be used in various batteries such as a lithium-sulfur battery, a lithium-air battery, a lithium-oxide battery, and a lithium all-solid-state battery, and the negative electrode active material and positive electrode active material used in these batteries can be used respectively.

A material having a capacity of 1 to 8 mAh/cm$^2$, preferably 3 to 7 mAh/cm$^2$ is preferred as a negative electrode active material, and a material which is easily alloyed with the lithium metal ion transferred from the lithium layer 15 may be used.

For example, the negative electrode material may be at least one element selected from the group consisting of Si, Sn, and Al, or alloys thereof, for instance having an atomic fraction of 50% or more of the active elements, or oxides thereof, or at least one carbon material selected from natural graphite, synthetic graphite, carbon black, carbon fiber, carbon nanotube and graphene, individually or in the form of mixtures or complexes. The negative electrode material as described above has a large initial irreversible capacity loss, but the initial irreversible capacity loss can be compensated by the supply of the metal lithium proposed in the present invention.

Especially, when the electrode suggested by the present invention is the negative electrode 1, it is preferable that the initial irreversible capacity of the electrode layer 11 is within 40% of the reversible capacity. If the irreversible capacity is too large, the supply amount of additional initial lithium may be too high, resulting in the reduction of preparation productivity.

In addition, the positive electrode active material may vary depending on the use of the lithium secondary battery 10, and a known material is used for the specific composition. For example, the positive electrode active material may be any one lithium metal oxide; lithium transition metal oxide selected from the group consisting of lithium cobalt oxide, lithium manganese oxide, lithium copper oxide, lithium nickel oxide and lithium manganese composite oxide, and lithium-nickel-manganese-cobalt oxide, more particularly may be, but is not limited to, $Li_{1+x}Mn_{2-x}O_4$ (wherein x is 0 to 0.33), lithium manganese oxides such as $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, $Cu_2V_2O_7$; lithium nickel oxides represented by $LiNi_{1-x}M_xO_2$ (wherein M=Co, Mn, Al, Cu, Fe, Mg, B or Ga, and x=0.01 to 0.3); lithium manganese composite oxide represented by $LiMn_{2-x}M_xO_2$ (wherein M=Co, Ni, Fe, Cr, Zn or Ta, and x=0.01 to 0.1) or $Li_2Mn_3MO_8$ (wherein M=Fe, Co, Ni, Cu or Zn), lithium-nickel-manganese-cobalt oxide represented by $Li(Ni_aCo_bMn_c)O_2$ wherein $0<a<1$, $0<b<1$, $0<c<1$, $a+b+c=1$), $Fe_2(MoO_4)_3$; sulfur element, disulfide compound, organosulfur compound and carbon-sulfur polymer $((C_2S_x)_n$: x=2.5 to 50, n≥2); graphite-based materials; carbon black-based materials such as Super-P, Denka black, acetylene black, Ketjen black, channel black, furnace black, lamp black, thermal black and carbon black; carbon derivatives such as fullerene; electrically conductive fibers such as carbon fiber or metal fiber; metal powders such as carbon fluoride, aluminum and nickel powder; and electrically conductive polymers such as polyaniline, polythiophene, polyacetylene, and polypyrrole; forms produced by carrying catalysts such as Pt or Ru to the porous carbon support.

In particular, the present invention is characterized by utilizing 100% of the ability of the positive electrode (3) to store reversibly and fully utilizing the difference between the positive electrode and the initially contained amount of lithium. Therefore, as the active material of the positive electrode 3 in the present invention, the larger the capacity, the more preferable. For example, the capacity may be 100 mAh/g to 300 mAh/g or also may be 300 mAh/g or more.

In addition, the electrode layer 11 may further include a conductor and a binder to serve as an electrode active material.

The conductor is used to further improve the electrical conductivity of the electrode active material. Such conductor is not particularly limited as long as it has electrical conductivity without causing a chemical change in the battery, and for example may be graphite such as natural graphite and artificial graphite; carbon blacks such as carbon black, acetylene black, Ketjen black, channel black, furnace black, lamp black, and summer black, etc.; electrically conductive fibers such as carbon fiber and metal fiber; metal powders such as carbon fluorine, aluminum, and nickel powder; electrically conductive whiskers such as zinc oxide and potassium titanate; an electrically conductive metal oxides such as titanium oxide; or polyphenylene derivatives, etc.

A binder may further be included for binding between the electrode active material and the electrically conductive material and for binding to the current collector. The binder may comprise a thermoplastic resin or a thermosetting resin. For example, polyethylene, polypropylene, polytetrafluoroethylene (PTFE), polyvinylidene fluoride (PVDF), styrene-butadiene rubber, tetrafluoroethylene-perfluoroalkylvinylether copolymers, vinylidene fluoride-hexafluoropropylene copolymers, vinylidene fluoride-chlorotrifluoroethylene copolymers, ethylene-tetrafluoroethylene copolymers, polychlorotrifluoroethylene, vinylidene fluoride-pentafluoropropylene copolymers, propylene-tetrafluoroethylene copolymers, ethylene-chlorotrifluoroethylene copolymers, vinylidene fluoride-hexafluoropropylene-tetrafluoroethylene copolymers, vinylidene fluoride-perfluoromethyl vinyl ether-tetrafluoroethylene copolymers, or ethylene-acrylic acid copolymers, etc. may be used alone or in combination, but are not necessarily limited thereto, and any binders are possible as long as they can be used as binders in the art.

In order to help the reduction of the irreversible capacity of the electrode layer 11 comprising the composition as described above, the lithium layer 15 suggested by the present invention should be limited in its thickness so that the lithium layer 15 can be formed on the pre-lithiation prevention layer 13 and then lithium metal ions can be transferred to the electrode layer 11, after activation charging, to alloy with the material of the electrode layer 11. The lithium layer may have a thickness of 0.5 µm or more and less than 5 µm.

The lithium layer 15 is formed by introducing a lithium foil for the movement of the lithium metal or by a method of pre-doping the lithium metal directly on the pre-lithiation prevention layer 13.

A method of using a metal foil, a method of depositing metal lithium, or a method of dispersing an excess amount of metal lithium-containing particles in a predetermined binder polymer and then applying the resultant product therefrom, and the like may be used as a method of pre-doping the lithium metal. The present invention especially uses a method of coating metal lithium by injection and continuous roll process such as rolling.

In one embodiment, when lithium is heated by heating the metal lithium at 600° C. under a vacuum condition on the order of 10 torr, lithium gas is generated. The lithium layer is deposited on the surface of the electrode by passing the surface of the electrode coated with the active material, while continuously supplying such lithium gas.

When the total thickness of the electrode is about 100 µm, the thickness of the lithium layer 15 is 1 µm or more and less than 5 µm, preferably in the range of about 1 to 4 µm, and this thickness corresponds to an amount which results in an increase in capacity of 0.2 to 1.0 mA/cm$^2$, preferably 0.3 to 0.8 mA/cm$^2$. In addition, the weight of the lithium layer is 0.05 or more and less than 0.3 mg/cm$^2$, preferably 0.05 to 0.2 mg/cm$^2$ per unit area. However, the conditions of the deposition process and the increased amounts of the thickness, weight, and current density of the lithium layer 15 are only an example, and the present invention is not limited thereto. In particular, the lithium layer 15 of the present invention can be further reduced in its thickness due to the formation of the pre-lithiation prevention layer 13.

Particularly, as suggested by the present invention, as the lithium layer 15 is formed with a thickness of less than 5 µm, the irreversible capacity reduction of less than 1 mAh/cm$^2$, which can occur in designs with high-capacity positive electrode and silicon negative electrode, is compensated and thus it is possible to prepare a battery that prevents the initial capacity reduction which is resulted from the battery using a large amount of silicon negative electrode and ensures long cycle life.

As another example, a method of forming a lithium coating film by dispersing particles containing an excess amount of lithium in a predetermined binder solution, continuously applying to the surface of the electrode, and passing this through a continuous roll press is possible. In this case, as the particles containing an excess amount of lithium, it is possible to use a lithium metal powder coated with a stabilizing layer on its surface.

As the binder solution, the binder as mentioned above in connection with the electrode active material may be used. In this case, the application method also follows the above-mentioned method.

The preparation of the electrode according to the present invention is not particularly limited, and a known method in this field may be used as it is or such a method may be applied.

As an example, the electrode may be formed by sequentially stacking a pre-lithiation prevention layer 13 and a lithium layer 15 on the electrode layer 11, or by forming a lithium layer on the pre-lithiation prevention layer and then laminating it to the electrode layer.

The electrode layer 11 can be formed by applying a slurry prepared by mixing an electrode active material, an electrically conductive material and a binder in an organic solvent onto the electrode current collector and then drying it, and selectively performing compression molding onto the electrode current collector in order to improve the density of the electrode.

In this case, as the organic solvent, it is preferable to use a solvent capable of uniformly dispersing the positive electrode active material, the binder and the conductor, and easily evaporating. Specifically, examples of the organic solvent may include acetonitrile, methanol, ethanol, tetrahydrofuran, water, isopropyl alcohol, and the like.

The pre-lithiation prevention layer 13 can be applied by a direct coating method or a laminating method after the preparation of the coating solution.

The coating solution is prepared by dissolving polymers or prepolymers or monomers constituting the pre-lithiation prevention layer 13 and an initiator in a solvent, and is coated on an electrode layer 11 as a substrate or on a separate substrate, and then dried. In this case, when the coating solution is prepared by using monomers, it is subjected to a UV polymerization or a thermal polymerization process.

The available initiator varies depending on crosslinking reaction and any known photoinitiator or thermal initiator may be used. As an example, the photoinitiator may be benzoin, benzoin ethyl ether, benzoin isobutyl ether, alpha methyl benzoin ethyl ether, benzoin phenyl ether, acetophenone, dimethoxyphenylacetophenone, 2,2-diethoxyacetophenone, 1,1-dichloroacetophenone, trichloroacetophenone, benzophenone, p-chlorobenzophenone, 2,4-dihydroxybenzophenone, 2-hydroxy-4-methoxybenzophenone, 2-hydroxy-2-methylpropiophenone, benzyl benzoate, benzoyl benzoate, anthraquinone, 2-ethyl anthraquinone, 2-chloro anthraquinone, 2-methyl-1-(4-methylthiophenyl)-morpholinopropanone-1,2-hydroxy-2-methyl-1-phenylpropan-1-one (Darocure 1173 from CIba Geigy), Darocure 1116, Irgacure 907, 2-benzyl-2-dimethylamino-1-(4-morpholinophenyl)-butanone-1,1-hydroxycyclohexyl phenyl ketone (Irgacure 184 from CIba Geigy), Michler's ketone, benzyl dimethyl ketal, thioxanthone, isopropyl thioxantone, chlorothioxanthone, benzyl, benzyldisulfide, butanedione, carbazole, fluorenone, and alpha acyl oxime ester, etc. The thermal initiator may be peroxide (—O—O—)-based benzoyl peroxide, acetyl peroxide, dilauryl peroxide, di-tert-butyl peroxide, cumyl hydroperoxide and the like, and may be azo compounds (—N=N—) such as azobisisobutyronitrile and azobisisobaleronitrile, etc.

A solvent capable of sufficiently dissolving monomers or polymers and an initiator can be used as the solvent, and preferably, a non-aqueous organic solvent is used. The non-aqueous organic solvent serves as a medium through which ions involved in the electrochemical reaction of the battery can migrate, and known carbonate-based, ester-based, ether-based, ketone-based, alcohol-based or aprotic solvents may be used. As an example, the non-aqueous organic solvent may be aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyltetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, triester phosphate, trimethoxymethane, dioxolane derivative, sulfolane, methylsulfolane, 1,3-dimethyl-2-imidazolidinone, propylene carbonate derivatives, tetrahydrofuran derivatives, ethers, methyl propionate, ethyl propionate and the like.

The content of the solvent may be in a level having a concentration to facilitate coating, and the specific content may vary depending on the coating method and apparatus.

The separate substrate used for laminating may be a glass substrate or a plastic substrate.

The coating process for forming the coating film is not particularly limited, and any known wet coating method can be used. As an example, a method of uniformly dispersing using a doctor blade or the like, a die casting method, a comma coating method, a screen printing method, and the like may be mentioned.

Next, a drying process for solvent removal after coating is performed. The drying process is performed at a temperature and for a period of time sufficient to sufficiently remove the solvent, and the conditions may vary depending on the type of the solvent, and thus are not specifically described in the present invention. As an example, the drying can be carried out in a vacuum oven at 30 to 200° C. As the drying method, drying methods such as drying by warm air, hot air or low-humidity air and vacuum drying can be used. The drying period of time is not particularly limited, but is usually in the range of 30 seconds to 24 hours.

The thickness of the pre-lithiation prevention layer 13 to be finally coated can be controlled by controlling the concentration of the coating solution for forming the pre-lithiation prevention layer 13 according to the present invention, or the number of coatings, etc.

The lithium layer 15 is formed on the pre-lithiation prevention layer 13. In this case, the formation of the lithium layer 15 follows the above description.

The electrode in which the electrode layer 11, the pre-lithiation prevention layer 13 and the lithium layer 15 as described above are sequentially stacked can be applied as the negative electrode and/or the positive electrode of the lithium secondary battery 10. In this case, lithium in the lithium layer 15 is completely consumed during the initial activation charging process of the battery, so that lithium in the form of metal does not remain on the surface of the pre-lithiation prevention layer 13.

Also, in the lithium secondary battery 10 of the present invention, the lithium layer 15 satisfies the following Equation 1 so as to utilize not only the amount of lithium corresponding to the initial irreversible consumption capacity of the negative electrode 1 but also the entire reversible lithium storage capacity of the positive electrode 3:

$$S < L \leq S + I,$$ [Equation 1]

wherein S=lithium storage capacity of the positive electrode−lithium capacity contained in the initial positive electrode;

L is the amount of lithium in the lithium layer; and

I is the initial irreversible consumption capacity at the negative electrode.

In the above Equation, S represents the difference between the lithium storage capacity of the positive electrode 3 and the lithium capacity contained in the initial positive electrode 3, and the positive electrode 3 used in the lithium secondary battery 10 including the lithium layer 15 of the present invention has a total reversible lithium storage capacity larger than the lithium capacity that can be initially released from the positive electrode. Therefore, since the amount L of lithium in the lithium layer 15 is greater than the amount S of lithium excluding the amount of lithium initially contained in the positive electrode 3 from the lithium storage capacity of the positive electrode, the capacity of the lithium secondary battery 10 can be dramatically increased by maximally utilizing the lithium storage capacity of the positive electrode 3.

Also, in the above Equation, I represents the initial irreversible consumption capacity of the negative electrode 1. It can be seen that the negative electrode 1 used in the lithium secondary battery 10 including the lithium layer 15 of the present invention has an initial irreversible consumption capacity and thus consumes lithium ions that are initially released from the positive electrode 3. Accordingly, in the present invention, since the amount L of lithium in the lithium layer 15 includes an amount corresponding maximally to the amount S calculated by excluding the amount of lithium initially contained in the positive electrode 3 from the lithium storage capacity of the positive electrode 3 and the irreversible capacity I initially consumed in the negative electrode, the capacity of the battery can be further increased by maximally utilizing the lithium storage capacity of the positive electrode 3 and replenishing lithium metal ions consumed due to the irreversible capacity in the negative electrode 1.

In order to facilitate understanding of Equation 1 according to the present invention, the case of a lithium secondary battery 10 in which the lithium layer 15 is formed on the negative electrode 1 and the active material of the positive electrode 3 is composed of lithium-free transition metal oxide and lithium-containing transition metal oxide is described as an example.

FIG. 3 is a schematic diagram for explaining the concept of the irreversible capacity, wherein FIG. 3(a) is a schematic diagram showing the irreversible capacity before the initial activation charging and FIGS. 3(b) and 3(c) are schematic diagrams showing the change in the irreversible capacity after the initial activation charging.

Referring to FIG. 3, if the lithium storage capacity of the positive electrode 3 is A and the lithium capacity initially included in the positive electrode 3 is B, the equation of A=B+S is established. B depends on the lithium containing transition metal compound and S depends on the lithium-free transition metal compound. Before the initial activation charging of the lithium secondary battery 10 of the present invention, the lithium layer 15 is in a state as shown in FIG. 3 (a) in which the lithium does not move. During the initial activation charging process of the lithium secondary battery 10, lithium in the lithium layer 15 starts to move, and after the initial activation charging is completed, the equation of L=S+I as shown in FIG. 3 (b) or L<S+I as shown in FIG. 3 (c) is established Since the lithium secondary battery 10 of the present invention satisfying the above-described Equation 1 can utilize not only the amount of lithium corresponding to the initial irreversible consumption capacity I of the negative electrode 1 but also the entire reversible lithium storage capacity (A=S+B) of the positive electrode 3, the reversible capacity after activation can be drastically increased and it is ensured that the metal lithium is completely consumed during activation, so that an effect of avoiding the risk of metallic lithium is provided.

Meanwhile, as shown in the structure of FIG. 1, the lithium secondary battery 10 includes a positive electrode 1, a negative electrode 3, a separator 5 and electrolyte (not shown) located therebetween, and the separator 5 may be excluded depending on the type of the battery.

In this case, the separator 5 may be made of a porous substrate, and the porous substrate may be any porous substrate commonly used in an electrochemical device. For example, a polyolefin-based porous film or a nonwoven fabric may be used, but is not limited thereto.

The separator 5 may be a porous substrate made of any one or a mixture of two or more selected from the group consisting of polyethylene, polypropylene, polybutylene, polypentene, polyethylene terephthalate, polybutylene terephthalate, polyester, polyacetal, polyamide, polycarbonate, polyimide, polyether ether ketone, polyethersulfone, polyphenylene oxide, polyphenylene sulfide, and polyethylene naphthalate.

The electrolyte solution of the lithium secondary battery 10 is a lithium salt-containing electrolyte solution which is a non-aqueous electrolyte consisting of a non-aqueous organic solvent electrolyte solution and a lithium salt, and also may include an organic solid electrolyte or an inorganic solid electrolyte, but is not limited thereto.

The non-aqueous organic solvent may be aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyltetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, triester phosphate, trimethoxymethane, dioxolane derivative, sulfolane, methylsulfolane, 1,3-dimethyl-2-imidazolidinone, propylene carbonate derivatives, tetrahydrofuran derivatives, ethers, methyl propionate, ethyl propionate and the like.

The lithium salt is a substance which is favorably soluble in the non-aqueous electrolyte, and for example, may be one lithium salt selected from the group consisting of LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $Li(FSO_2)_2N$, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2)_2NLi$, chloroborane lithium, lower aliphatic carboxylic acid lithium, 4-phenylboric acid lithium imide, and combinations thereof.

The organic solid electrolyte may be, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, polymer containing an ionic dissociation group and the like.

The inorganic solid electrolyte may be, for example, nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

Also, in order to improve the characteristics of charging/discharging, flame retardancy, etc., for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinones, N,N-substituted imidazolidine, ethylene glycol dialkyl ether, ammonium salt, pyrrole, 2-methoxyethanol, aluminum trichloride, etc. may be added to the non-aqueous electrolyte. In some cases, halogen-containing solvents such as carbon tetrachloride and ethylene trifluoride may be further added in order to impart nonflammability, and carbon dioxide gas may be further included in order to improve the high-temperature conservation characteristics.

The type of lithium secondary battery 10 as described above is not particularly limited, and may be, for example, a jelly-roll type, a stack type, a stack-folding type (including a stack-Z-folding type), or a lamination-stack type, preferably a stack-folding type.

The electrode assembly in which the positive electrode, the separator, and the negative electrode are sequentially stacked is prepared, and the electrode assembly is inserted into the battery case, and then the electrolyte solution is injected into the upper part of the case and sealed with cap plate and gasket to assemble the lithium secondary battery.

In this case, the lithium secondary battery can be classified into various types of batteries such as lithium-sulfur battery, lithium-air battery, lithium-oxide battery, and lithium all-solid-state battery depending on the type of positive electrode material and separator used, can be classified into cylindrical, rectangular, coin-shaped, pouch type depending on the type, and can be divided into bulk type and thin film type depending on the size. The structure and preparing method of these batteries are well known in the art, and thus detailed description thereof is omitted.

The lithium secondary battery according to the present invention can be used as a power source for devices requiring high capacity and high rate characteristics, etc. Specific examples of the device may include, but are not limited to, a power tool that is powered by a battery powered motor; electric cars including an electric vehicle (EV), a hybrid electric vehicle (HEV), a plug-in hybrid electric vehicle (PHEV), and the like; an electric motorcycle including an electric bike (E-bike) and an electric scooter (Escooter); an electric golf cart; and a power storage system, Hereinafter, it will be apparent to those skilled in the art that although the preferred embodiments are shown to facilitate understanding of the present invention, the following examples illustrate only the present invention and various changes and modifications may be made within the scope and spirit of the present invention. It is also natural that such variations and modifications are within the scope of the appended claims.

EXAMPLES

Example 1

A positive electrode and a negative electrode of a lithium secondary battery were prepared by the following method, and a lithium secondary battery was prepared.

(1) Preparation of Negative Electrode

80% by weight of SiO (Shinetsu KSC1064), 10% by weight of graphite, 10% by weight of carboxymethylcellulose and 30% by weight of water were mixed to prepare a slurry. The slurry was coated on a copper collector plate having a thickness of 10 μm and dried at 120° C. for 12 hours to form an electrode layer (loading amount: 5.4 mAh/cm$^2$)

A coating solution was prepared by adding polyvinylidene fluoride-hexafluoropropylene (PVdF-HFP) to an acetonitrile solvent. A free-standing film (1 μm) was prepared by solution-casting the coating solution onto a substrate (PTFE). The film was dried in a vacuum oven at 80° C. for 24 hours to prepare a pre-lithiation prevention layer.

A pre-lithiation prevention layer was disposed on the first electrode layer, a lithium foil (thickness of 5 μm) as a second electrode layer was laminated thereon, and then rolled to prepare a negative electrode having a multilayer structure.

(2) Preparation of Positive Electrode 500 ml of acetonitrile was mixed with LCO:Super-P: binder (PVdF) in a weight ratio of 95:2.5:2.5 by a paste mixer for 5 minutes to prepare a slurry composition.

Next, the prepared positive electrode slurry composition was coated on a current collector (Al Foil) and dried at 50° C. for 12 hours to prepare a positive electrode. At this time, the loading amount of LCO was 4.2 mAh/cm$^2$.

(3) Assembly of Battery

A polyethylene porous film was interposed between the negative electrode and the positive electrode prepared in the above (1) and (2), and then the electrode assembly rolled at a pressure of 3 bar was inserted into a battery case of a pouch type. Thereafter, A non-aqueous electrolyte solution (1M LiPF$_6$, FEC:DEC=3:7 (volume ratio)) was injected into the battery case and then completely sealed to prepare a lithium secondary battery.

Example 2

A lithium secondary battery was prepared by the same manner as in Example 1 except that the lithium foil having a thickness of 3.4 μm is used.

Example 3

A lithium secondary battery was prepared by the same manner as in Example 1 except that the lithium foil having a thickness of 20 μm is used.

Example 4

A lithium secondary battery was prepared by the same manner as in Example 1 except that the pre-lithiation prevention layer is formed at a thickness of 0.5 μm.

Example 5

A lithium secondary battery was prepared by the same manner as in Example 1 except that the pre-lithiation prevention layer is formed at a thickness of 5 μm.

Example 6

A lithium secondary battery was prepared by the same manner as in Example 1 except that polyethylene oxide (MW: 20,000,000 g/mol) is used as the pre-lithiation prevention layer.

Comparative Example 1

A lithium secondary battery was prepared by the same manner as in Example 1 except that only the electrode layer is used as a negative electrode.

Comparative Example 2

A lithium secondary battery was prepared by the same manner as in Example 1 except that the negative electrode is produced by rolling a lithium foil to a copper current collector.

Comparative Example 3

A lithium secondary battery was prepared by the same manner as in Example 1 except that the negative electrode is formed by forming a lithium metal layer on the electrode layer according to the method disclosed in Korean Patent No. 10-1156608.

Comparative Example 4

A lithium secondary battery was prepared by the same manner as in Example 1 except that the negative electrode having a laminated structure of an electrode layer/lithium layer/pre-lithiation prevention layer is prepared by forming a pre-lithiation prevention layer on top of the electrode layer.

Comparative Example 5

A lithium secondary battery was prepared by the same manner as in Example 1 except that the negative electrode having a laminated structure of a pre-lithiation prevention layer/electrode layer/lithium layer is prepared by forming a pre-lithiation prevention layer at the bottom of the electrode layer.

Experimental Example 1

The lithium secondary batteries prepared in Examples and Comparative Examples were activated under the condition of 0.1 C SOC 100%, and charging/discharging was performed in the range of 3.0 to 4.2 V to confirm the number of cycles which maintains 90% irreversible capacity, and the results are shown in Table 1 below.

| | Number of cycles (Maintenance of 90% or less of capacity) |
|---|---|
| Example 1 | 569 |
| Example 2 | 440 |
| Example 3 | 38 |
| Example 4 | 465 |
| Example 5 | 85 |
| Example 6 | 235 |
| Comparative Example 1 | 13 |
| Comparative Example 2 | 173 |
| Comparative Example 3 | 210 |
| Comparative Example 4 | 256 |
| Comparative Example 5 | X |

Through the above Table 1, the following facts were found.

In the case of Example 1, the negative electrode irreversible was completely compensated, and in Example 2, it was slightly reduced. Also, in the case of Example 3, it was found that an excess amount is compensated and thus the reduction in capacity is caused by the generation of lithium dendrite upon charging.

In the case of Comparative Example 1, it was found that a high initial irreversibility results in the reduction in capacity to less than 90% relative to the initial capacity within 20 cycles.

In the case of Example 4, the pre-lithiation prevention layer has a thin thickness, and thus exhibited the reduction in its performance compared with Example 1 due to the side reaction between the silicon electrode and lithium before assembling the battery. In the case of Example 5, the thickness is thicker and acts as a resistor, and thus the performance of the battery is reduced. The PEO material of Example 6 exhibited the reduction in performance due to the inferior stability with the lithium metal electrode and thus the reduction in the irreversible compensation amount.

Comparative Example 2 showed the performance of the lithium metal electrode without the silicon electrode. In Comparative Example 3, it was found that immediately after the deposition process, the performance is reduced by the reaction of silicon electrode and lithium electrode. This result was also similar to that of Comparative Example 4. In the structure of Comparative Example 5, it was found that the battery was not driven because it was located between the Cu current collector and the silicon electrode and interferes with the electron transfer to the silicon electrode.

EXPLANATION OF SYMBOLS

| | |
|---|---|
| 1: negative electrode | 3: positive electrode |
| 5: separator | 10: lithium secondary battery |
| 11: electrode layer | 11': lithium addition electrode |
| 13: pre-lithiation prevention layer | 15: lithium layer |

The invention claimed is:

1. An electrode for a lithium secondary battery, comprising:
    an electrode layer;
    a pre-lithiation prevention layer formed on the electrode layer; and
    a lithium layer formed on the pre-lithiation prevention layer,
    wherein the electrode layer, pre-lithiation prevention layer, and lithium layer are sequentially stacked, and
    wherein the pre-lithiation prevention layer includes at least one selected from the group consisting of polyethylene oxide, polypropylene oxide, polydimethylsiloxane, polyacrylonitrile, polymethylmethacrylate, polyvinyl chloride, polyvinylidene fluoride, polyvinylidene fluoride-co-hexafluoropropylene, polyethylene imine, polyphenylene terephthalamide, polymethoxy polyethylene glycol methacrylate, and poly 2-methoxyethyl glycidyl ether.

2. The electrode for the lithium secondary battery of claim 1, wherein the electrode layer comprises a positive electrode active material or a negative electrode active material.

3. The electrode for the lithium secondary battery of claim 1, wherein the pre-lithiation prevention layer has a thickness of 0.5 to 5 μm.

4. The electrode for the lithium secondary battery of claim 1, wherein the pre-lithiation prevention layer has a lithium ion conductivity of $10^{-3}$ S/cm or less.

5. The electrode for the lithium secondary battery of claim 1, wherein, after initial activation charging, lithium in the lithium layer does not remain as lithium in the form of metal.

6. The electrode for the lithium secondary battery of claim 1, wherein the lithium layer has a thickness of 0.5 μm or more and less than 5 μm.

7. The electrode for the lithium secondary battery of claim 1, wherein the lithium layer has a weight per unit area of 0.05 mg/cm$^2$ or more and less than 0.3 mg/cm$^2$.

8. The electrode for the lithium secondary battery of claim 1, wherein the electrode is a negative electrode, and wherein the electrode layer includes at least one active element selected from the group consisting of Si, Sn, and Al; alloys having an atomic fraction of 50% or more of the active elements, or oxides thereof; at least one carbon material selected from natural graphite, synthetic graphite, carbon black, carbon fiber, carbon nanotube and graphene; and mixtures or complexes thereof.

9. The electrode for the lithium secondary battery of claim 1, wherein the electrode is a negative electrode, and wherein the electrode layer has a theoretical capacity per unit weight of 1 to 8 mAh/cm$^2$.

10. The electrode for the lithium secondary battery of claim 1, wherein the electrode is a negative electrode, and wherein the initial irreversible capacity of the negative electrode is within 40% of the reversible capacity.

11. The electrode for the lithium secondary battery of claim 1, wherein the electrode is a positive electrode, and wherein the electrode layer includes at least one selected from the group consisting of lithium metal oxides, lithium transition metal oxides, vanadium oxides, sulfur element, disulfide compounds, organosulfur compounds, carbon-sulfur polymers (($C_2S_x)_n$: x=2.5 to 50, n≥2), graphite-based materials, carbon black-based materials, carbon derivatives, electrically conductive fibers, metal powder, and electrically conductive polymers.

12. A lithium secondary battery comprising a negative electrode, a positive electrode, and a separator and electrolyte located therebetween,
    wherein at least one of the negative electrode and the positive electrode is the electrode of claim 1 in which the electrode layer, the pre-lithiation prevention layer and the lithium layer are sequentially stacked.

13. The lithium secondary battery of claim 12, wherein the positive electrode has an overall reversible lithium storage capacity greater than the lithium capacity that can be released from the initial positive electrode.

14. The lithium secondary battery of claim 12, wherein the lithium layer satisfies the following equation (1):

$$S < L \leq S + I \quad \text{[Equation 1]}$$

wherein S=lithium storage capacity of the positive electrode−lithium capacity contained in the initial positive electrode;
L is the amount of lithium in the lithium layer; and
I is the initial irreversible consumption capacity at the negative electrode.

15. The lithium secondary battery of claim 12, wherein the lithium secondary battery is any one of a lithium-sulfur battery, a lithium-air battery, a lithium-oxide battery or a lithium all-solid-state battery.

* * * * *